United States Patent Office 3,476,785
Patented Nov. 4, 1969

3,476,785
PROCESS FOR THE PREPARATION OF
CARBOXYLIC ACID ARYL ESTERS
Hans-Leo Huelsmann, Witten-Rudinghausen, and
Gustav Renckhoff, Witten, Ruhr, Germany, assignors to Chemische Werke Witten G.m.b.H.,
Witten, Ruhr, Germany
No Drawing. Filed Dec. 4, 1963, Ser. No. 328,101
Claims priority, application Germany, Dec. 7, 1962,
C 28,605
The portion of the term of the patent subsequent
to Dec. 5, 1984, has been disclaimed
Int. Cl. C07c 69/00; C09f 5/08
U.S. Cl. 260—410.5                     15 Claims

ABSTRACT OF THE DISCLOSURE

Process for the preparation of a carboxylic acid aryl ester which comprises reacting a methyl ester of an aliphatic or alicyclic mono- or polycarboxylic acid with a hydroxyaryl compound at a temperature of at least 160° C. in the presence of an ester radical interchange catalyst, while continuously removing methyl alcohol formed during the reaction from the reaction system. Exemplary hydroxyaryl compounds which may be employed include phenol, cresol, β-naphthol and benzylphenol. Mixed methyl-aryl esters also may be produced by the process.

---

The preparation of carboxylic acid aryl esters has previously generally been accomplished by reacting a carboxylic acid chloride with the corresponding phenol in the presence of alkalies or tertiary amines. This process has a disadvantage in that the acid chlorides are difficult to handle because they are very reactive and also are highly corrosive. Thus, the preparation and purification of these compounds requires expensive corrosion-resistant apparatus.

The foregoing also applies to a modification of the above process which consists of heating the carboxylic acids with a phenol in the presence of compounds which form acid chlorides, such as phosphorus pentachloride, phosphorus oxychloride, or thionyl chloride, whereby the aryl ester is formed and hydrogen chloride is split-off. The direct esterification of carboxylic acids with phenols in the presence of very large quantities of water-absorbing compounds, such as phosphorus pentoxide or polyphosphoric acids is also known. However, this process produces generally poor yields and only impure, very darkly colored products which can be purified in only a cumbersome manner.

It is also known to prepare carboxylic acid aryl esters by reacting the carboxylic acids with diaryl carbonates in the presence of catalysts. This process is also cumbersome since diaryl carbonates must first be produced using phosgene.

It has previously been proposed to prepare phenyl esters of carboxylic aromatic mono- and polycarboxylic acids by heating the methyl esters of these carboxylic acids with phenolic components, in the presence of ester radical-interchange catalysts, to temperature above 160° C. while continuously removing the split-off methyl alcohol from the reaction mixture.

In accordance with the present invention, it has been found that aryl esters of aliphatic and alicyclic mono- or polycarboxylic acids may be produced in a simple manner by heating the methyl esters of these acids with a hydroxyaryl compound, in these presence of an ester radical-interchange catalyst and at a temperature above 160° C., while continuously removing the split-off methyl alcohol from the reaction mixture. Exerplary of hydroxyaryl compounds which may be employed are phenol and naphthols or phenols and naphthols substituted by alkyl and/or aralkyl groups.

Starting materials for the process of the present invention are the aliphatic or alicyclic mono- or polycarboxylic acids and exemplary of such acids are acetic acid, chloroacetic acid, valeric acid, caprylic acid, lauric acid, bromolauric acid, stearic acid, undecylenic acid, oleic acid, linoleic acid, oxalic acid, succinic acid, sebacic acid, maleic acid, α,α,γ-trimethyl adipic acid, cyclohexane carboxylic acid, and cyclohexane-1,4-dicarboxylic acid.

Examplary of the hydroxyaryl compounds which may be employed, in addition to phenol, are the monovalent phenols or naphthols substituted by one or more alkyl or aralkyl groups, such as the isomeric cresols or xylenols, butylphenols, ocylphenols, benzylphenols and β-naphthol. Mixed aryl esters may be obtained by using phenol mixtures, the mixed esters being of interest for some uses because of the low melting points thereof.

The ester radical-interchange catalysts which may be employed are the acid or alkaline catalysts known for this purpose, such as polyphosphoric acids, acid-alkaline phosphates such as monosodium hydrogen phosphate or dipotassium monohydrogen phosphate, alkali metal or alkaline earth metal hydroxides, tertiary amines, and the like. Particularly advantageous catalysts are butyl titanate and the fatty acid salts of the metals of Group II of the Periodic System, such as calcum stearate or the zinc salt of the preliminary run coconut fatty acids. Other particularly advantageous ester radical-interchange catalysts are tin compounds, particularly fatty acid salts of tin, such as tin-(II)-stearte, since they dissolve easily in the reaction mixture and do not exert any decomposing or discoloring action thereon. The catalyst is generally employed in a quantity of about 0.5 to 5% by weight, based upon the quantity of methyl ester to be ester radical-interchanged, but smaller or larger quantities may be used if desired. The optimum quantity may be easily determined by a simple preliminary experiment.

When using the methyl esters of polycarboxylic acids, the reaction may be performed in a manner such that mixed methyl-aryl esters are obtained as the primary products. These products may be easily separated from the diaryl esters formed and from any unreacted starting material by distillation or crystallization since the boiling points and solubility properties are considerably different in most cases.

The hydroxyaryl component is generally employed in at least the equivalent amount based upon the quantity of the methyl ester of the carboxylic acid used. In order to expedite the reaction, it is frequently desirable to use an excess, i.e., up to 6 moles of the hydroxyaryl reactant per equivalent of the methyl ester reacted. The excess hydroxyaryl compound used may be easily removed by distillation upon termination of the reaction, if necessary at subatmospheric pressure. For the preparation of the mixed methyl-aryl esters, as many equivalents of the hydroxyaryl reactant are employed as there are methyl ester groups of the polycarboxylic acid methyl esters to be reacted, or reaction is effected with an excess of the hydroxyaryl reactant and the reaction is terminated prior to completion.

The process of the present invention is prefrably performed at temperatures in the range of about 190 to 250° C. although the reaction temperature may be higher if the reactants possess sufficient thermal stability. Below 160° C., the ester radical-interchange reaction occurs too slowly to be of economic value, even in the presence of catalysts.

The ester radical-interchange reaction is generally conducted at atmospheric pressure although when using low-boiling carboxylic acid esters as starting materials, it may be necessary to operate under super-atmospheric pressure in order to attain a reaction temperature within the range previously indicated. On the other hand, when using very high-boiling reactants, it may be desirable to facilitate the removal of the split-off methyl alcohol by operating at sub-atmospheric pressure.

The carboxylic acid aryl esters are technically important as softeners and as intermediates in organic syntheses. The dicarboxylic acid diaryl esters in particular are valuable intermediates for use in polycondensation reactions.

The invention will be further illustrated by reference to the following specific examples:

Example 1

500 grams of stearic acid methyl ester (about 1.7 moles) are heated, while stirring, with 315 grams of phenol (about 3.4 moles) and 20.4 grams of the zinc salt of preliminary run coconut fatty acids, as a catalyst, in a flask equipped with a fractionating column while a nitrogen stream is passed through the apparatus at a rate of 1,000 milliliters per minute. The discharged gas stream is passed through a cooler and a cooling trap maintained at a temperature of −50° C. In the course of the ester radical-interchange reaction, the temperature of the reaction mixture rises continuously from 180 to 212° C. The methanol which is split-off during the reaction is distilled and is removed from the distillation column overhead at temperatures up to a maximum of 70° C. The batch is distilled in vacuo after 6.25 hours and, after distillation of the unreacted phenol and stearic acid methyl ester, 532 grams of stearic acid phenyl ester pass over at a temperature of 225° C./1 torr. The ester melts at 58° C., has an acid number of 1.8 and a saponification number of 156.5 (calculated=156). Including the stearic acid methyl ester recovered (51 parts by weight), the yield of stearic acid phenyl ester amounts to 98.1% of theoretical.

Example 2

593 grams of oleic acid methyl ester (about 2 moles) are heated, while stirring, with 188 grams of phenol (about 2 moles) and about 6 parts by weight of tin stearate, as a catalyst, in a flask equipped with a fractionating column. A nitrogen stream is passed, at a rate of 500 milliliters per minute, through the apparatus during the ester radical-interchange reaction. Methanol vapor split-off during the reaction is carried in the gas stream to a cooler and cooling trap connected thereto maintained at −50° C. where the vapor is condensed. The temperature of the reaction mixture rises from 204 to 221° C. during a period of 6.5 hours while the split-off methanol distills overhead at temperatures up to a maximum of 70° C.

After the 6.5 hour reaction is completed, another 94 grams of phenol (about 1 mole) are added, and, after a total reaction time of 14.5 hours, another 94 grams (about 1 mole) of phenol are added. After a total reaction time of 22.5 hours, the batch is distilled in vacuo. After distillation of the unreacted phenol and oleic acid methyl ester, 662.3 grams of oleic acid phenyl ester distill in a temperature range of 203 to 217° C./1 torr. The ester has an acid number of 2, and a saponification number of 159 (calculated=157). Including the oleic acid methyl ester recovered (37.3 grams), the yield of oleic acid phenyl ester amounts to 98.5% of theoretical.

Example 3

427 grams of cyclohexane carboxylic acid methyl ester (about 3 moles) are ester radical-interchanged with 847 grams of phenol (about 9 moles), in the presence of 12.7 grams of the zinc salt of preliminary run coconut fatty acids as a catalyst, using the apparatus and following the procedure of Example 1 above. The temperature of the reaction mixture is in the range of 180 to 182° C. during the ester radical-interchange reaction and the batch is distilled in vacuo after 42 hours. After distillation of the unreacted phenol and cyclohexane carboxylic acid methyl ester, 498.5 grams of cyclohexane carboxylic acid phenyl ester are distilled at a temperature of 167° C./19 torr. The ester has an acid number of 0, and a saponification number of 271 (calculated=275). Including the cyclohexane carboxylic acid methyl ester recovered (64 grams), the yield of cyclohexane carboxylic acid phenyl ester amounts to 95.5% of theoretical.

Example 4

600 grams of cyclohexane-1,4-dicarboxylic acid dimethyl ester (about 3 moles cis-trans isomeric mixture) are heated, in the apparatus used in Example 1, with 564 grams of phenol (about 6 moles) and 12 grams of tin stearate, as a catalyst, while passing a nitrogen stream through the apparatus at a rate of 700 to 900 milliliters per minute and while refluxing the phenol. The split-off methanol is distilled overhead. During the ester radical-interchange reaction, the temperature of the reaction mixture increases continuously to 236° C. After a reaction time of 47 hours, the unreacted phenol and cyclohexane-1,4-dicarboxylic acid dimethyl ester are distilled off from the reaction mixture and a vacuum distillation of the remainder of the reaction mixture yields 804.5 grams of cyclohexane-1,4-dicarboxylic acid diphenyl ester (cis-trans isomeric mixture) having a boiling range of 214 to 224° C./1.1 to 1.25 torr.

The ester has an acid number of 8.5 and a saponification number of 344 (calculated=347). Including the cyclohexane-1,4-dicarboxylic acid dimethyl ester recovered (12 grams), the yield of cyclohexane-1,4-dicarboxylic acid diphenyl ester amounts to 84.4% of theoretical.

Example 5

428 grams of lauric acid methyl ester (2 moles) are ester radical-interchanged with 270 grams of m-cresol (2.5 moles) in the presence of 2.2 parts by weight of tin stearate catalyst (0.5% by weight based upon the lauric acid ester), as described in the foregoing examples. The temperature of the reaction mixture rises from 218° C. at the beginning of the reaction to 240° C. after 16 hours has elapsed. About 80% of the calculated split-off methanol is condensed in the condenser. After distillation of the excess m-cresol, 76 grams of lauric acid methyl ester are recovered. Then, 473 grams of lauric acid m-cresyl ester distill in the range of 218 to 220° C. at 15 torr. This corresponds to a yield of 99% of the methyl ester reacted or to a reaction completion of 81.5%. The ester forms a colorless viscous oil and has a saponification number of 194 (calculated=195).

Example 6

288 grams of maleic acid dimethyl ester (2 moles) and 540 grams of m-cresol (5 moles) are ester radical-interchanged for 22 hours, in the presence of 1.44 grams of tin stearate catalyst, following the general procedure of Example 1 above, during which time the temperature of the reaction mixture rises from 200 to 230° C. Care should be observed that the temperature rises no higher since decomposition of the maleic acid esters will occur at higher temperatures. After distillation of the excess and unreacted m-cresol at sub-atmospheric pressure, 90 grams of maleic acid methyl-m-cresyl ester distill as a faintly yellowish oil at a temperature in the range of 127 to 128° C., at 0.4 torr. The maleic acid di-m-cresyl ester remaining in the still residue (420 grams) cannot be further distilled without decomposition and it is, therefore, recrystallized from xylene in the presence of some carbon. The diester has a melting point of 82° C., and a saponification number of 377 (calculated=380).

Example 7

199 grams of maleic acid dimethyl ester (1.38 moles) and 149 grams of p-cresol (1.38 moles) are ester radical-interchanged for 5 hours, in the presence of 1 gram of tin stearate catalyst, following the general procedure of Example 1 above, during which time the reaction temperature rises from 200 to 222° C. Any unreacted maleic acid dimethyl ester and p-cresol are initially distilled at subatmospheric pressure. Then, 112 grams of maleic acid methyl-p-cresyl ester distill in a temperature range of 125 to 128° C., at torr. The ester has a melting point of 57 to 58° C. and a saponification number of 510 (calculated=512). The still residue contains 80 grams of maleic acid di-p-cresyl-ester which may be added to a new batch for the production of the maleic acid methyl-cresyl ester together with the preliminary run of the distillation. When recrystallized from xylene, the di-p-cresyl ester melts at a temperature of 161 to 162° C. and has a saponification number of 383 (calculated=380).

Example 8

292 grams of succinic acid dimethyl ester (about 2 moles) are ester radical-interchanged with 188 grams of phenol (about 2 moles), in the presence of 2.9 grams of tin stearate catalyst (1% by weight based upon the succinic acid dimethyl ester) following the general procedure of Example 1 above. Another 188 grams of phenol (about 2 moles) are added during the reaction in a manner such that the temperature of the reaction mixture remains above 215° C. The unreacted phenol is distilled off after a reaction time of 37 hours. After a preliminary run of 62.5 grams, which distills at a temperature between 162 and 200° C. at 10 torr, and which consists substantially of succinic acid methyl phenyl ester, 435 grams of succinic acid diphenyl ester distill at a temperature of 218° C. at 10 torr. The ester has a saponification number of 418 (calculated=415) and melts at 122° C. after recrystallization from benzene. The yield of succinic acid diphenyl ester is 80.5% of theoretical, based upon the quantity of dimethyl ester employed.

Example 9

177 grams of oxalic acid dimethyl ester (1.5 moles) are ester radical-interchanged with 282 grams (3 moles) of phenol in the presence of 1.6 grams of butyl titanate catalyst (0.9% by weight based upon the dimethyl ester used) following the general procedure of Example 1 above. In the course of the reaction, the reaction temperature rises from 160 to 200° C., with distillation of split-off methanol. The unreacted phenol and 70.5 grams of oxalic acid dimethyl ester are distilled off after 30 hours; 43.0 grams of a fraction containing 13 grams of oxalic acid methyl phenyl ester and 30 grams of oxalic acid diphenyl ester then distill in the temperature range of 136 to 165° C. at 8 to 10 torr and 164 grams of oxalic acid diphenyl ester distill in the temperature range of 180 to 187° C. at 8 torr. After recrystallization from xylene, the ester melts at 138.5 to 139° C. and has a saponification number of 463 (calculated=463). The yield of diphenyl ester is 89%, based upon the diphenyl ester reacted.

Example 10

158 grams (1 mole) of caprylic acid methyl ester and 180 grams (1.25 moles) of β-naphthol are ester radical-interchanged, following the general procedure of Example 1 above, for 14 hours in the presence of 0.8 part by weight of tin stearate, while the boiling temperature in the reaction flask rises from an initial 225° C. up to 290° C. During subsequent vacuum distillation, after the distillation of some unreacted caprylic acid methyl ester and excess β-naphthol, 215 grams of caprylic acid-β-naphthyl ester are obtained, having a boiling temperature in the range of 170 to 180° C. at 0.2 torr and a melting temperature of 41 to 42° C., after recrystallization from benzene. The saponification number is 204 (calculated=208).

Example 11

90 grams of caprylic acid methyl ester and 131 grams of a mixture of technical isomeric benzyl phenols (molar ratio of ester to phenol=1:1.25) are ester radical-interchanged, following the general procedure of Example 1 above, for 12 hours in the presence of 0.9 part by weight of antimony trioxide catalyst, while the reaction temperature is raised from 240 to 260° C. 12 parts by weight, corresponding to 66% of the expected amount of methanol, are condensed in a condenser. During distillation of the reaction mixture, after a preliminary distillation of some unreacted caprylic acid methyl ester and excess benzyl phenol, 108 grams of caprylic acid benzyl phenyl ester are obtained, which compound boils in the temperature range of 185 to 195° C. at torr. The compound is a colorless viscous oil having a saponification number of 176 (calculated=181). The yield is 82% by weight based upon the caprylic acid methyl ester reacted.

Example 12

214 grams (1 mole) of lauric acid methyl ester and 187.5 grams (1.25 moles) of 4-tert.-butyl phenol are ester radical-interchanged, following the general procedure of Example 1 above, for 14 hours in the presence of 1.1 grams of tin stearate, while the reaction temperature is raised from 258 to 300° C. 30 grams of methanol (calculated=32 grams) are collected. After a preliminary distillation of some unreacted lauric acid methyl ester and excess butyl phenol, 266 grams of lauric acid-4-tert.-butyl phenyl ester, corresponding to 80% of the theoretical, are obtained by distillation of the reaction mixture at a temperature of 178 to 180° C. at 0.1 torr, the compound having a melting temperature of 18 to 20° C. and a saponification number of 166 (calculated=169).

It will be obvious to those skilled in the art that many modifications may be made within the scope of the present invention without departing from the spirit thereof, and the invention includes all such modifications.

What is claimed is:

1. A process for the preparation of a carboxylic acid aryl ester which comprises reacting a methyl ester of an acid selected from the group consisting of aliphatic and alicyclic mono- and polycarboxylic acids with an at least equivalent quantity of a hydroxyaryl compound selected from the group consisting of phenol, naphthol and phenols and naphthols substituted by one or more alkyl or aralkyl groups at a temperature in excess of 160° C. and in the presence of an acidic, alkaline or metallic salt ester radical-interchange catalyst, while continuously removing methyl alcohol from the reaction mixture.

2. A process according to claim 1 in which the hydroxyaryl compound is selected from the group consisting of alkyl and aralkyl phenols and naphthols.

3. A process according to claim 1 in which the reaction is effected at a temperature in the range of about 190 to 250° C.

4. A process according to claim 1 in which the catalyst is a fatty acid salt of a metal selected from the group consisting of tin and the Group II metals.

5. A process according to claim 4 in which the acid salt is a stearate.

6. A process according to claim 1 in which the hydroxyaryl compound is present in an excess up to about 6 moles for each methyl ester group.

7. A process according to claim 1 in which a methyl ester of a polycarboxylic acid is reacted with the hydroxyaryl compound present in a quantity of about 1 to 2 moles for each methyl ester group to be exchanged and, after removal of the calculated quantity of methanol split-off, separating a mixed methyl-aryl ester from the reaction mixture.

8. A process according to claim 1 in which the reaction is conducted under superatmospheric pressure.

9. A process according to claim 1 in which the reaction is conducted under subatmospheric pressure.

10. A process according to claim 1 in which the catalyst is selected from the group consisting of butyl titanate, tin stearate and antimony trioxide.

11. A process according to claim 1 in which the hydroxyaryl compound is selected from the group consisting of phenol, cresol, β-naphthol and benzylphenol.

12. A process according to claim 1 in which the methyl ester is selected from the group consisting of stearic acid methyl ester, oleic acid methyl ester, cyclohexane carboxylic acid methyl ester, cyclohexane-1, 4-dicarboxylic acid dimethyl ester, lauric acid methyl ester, maleic acid dimethyl ester, succinic acid dimethyl ester, oxalic acid dimethyl ester and caprylic acid methyl ester.

13. A process for the preparation of a carboxylic acid aryl ester which comprises reacting a methyl ester of an acid selected from the group consisting of aliphatic and alicyclic mono- and polycarboxylic acids with an at least equivalent quantity of a hydroxyaryl compound selected from the group consisting of phenol, cresol, β-naphthol and benzylphenol at a temperature in the range of about 190 to 250° C. and in the presence of an acidic, alkaline or metallic salt ester radical-interchange catalyst, while continuously removing methyl alcohol from the reaction mixture.

14. A process according to claim 13 in which the methyl ester is selected from the group consisting of stearic acid methyl ester, oleic acid methyl ester, cyclohexane carboxylic acid methyl ester, cyclohexane-1, 4-dicarboxylic acid dimethyl ester, lauric acid methyl ester, maleic acid dimethyl ester, succinic acid dimethyl ester, oxalic acid dimethyl ester and caprylic acid methyl ester.

15. A process according to claim 14 in which the catalyst is selected from the group consisting of butyl titanate, tin stearate, antimony trioxide, calcium stearate and the zinc salt of the preliminary run coconut fatty acids.

References Cited

UNITED STATES PATENTS 3,184,425   5/1965   Jaruzelski et al. _____ 260—479

OTHER REFERENCES

Groggins: Processes in Organic Synthesis (fourth edition, 1952), pp. 609–10, 616–19.

LORRAINE A. WEINBERGER, Primary Examiner

R. WEISSBERG, Assistant Examiner

U.S. Cl. X.R.

260—408, 468, 479